Patented Sept. 26, 1950

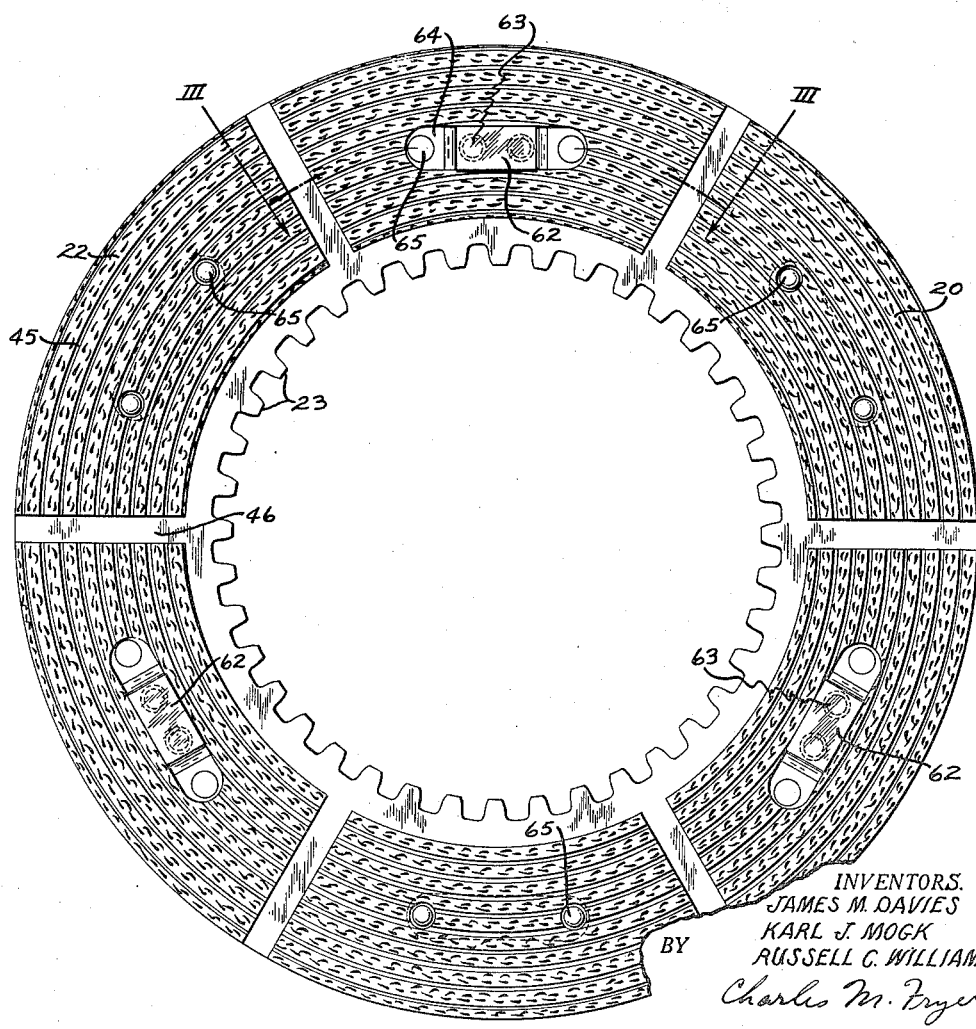

2,523,501

UNITED STATES PATENT OFFICE 2,523,501

CLUTCH DISK SEPARATOR

James M. Davies, Karl J. Mogk, and Russell C. Williams, Peoria, Ill., assignors to Caterpillar Tractor Co., San Leandro, Calif., a corporation of California Application January 15, 1947, Serial No. 722,204

2 Claims. (Cl. 192—69)

This invention relates to clutches and particularly to so-called wet plate clutches in which the friction surfaces of the clutch plates operate in a bath of liquid coolant such as oil.

One of the disadvantages of wet plate or oil cooled clutches is that free circulating oil is excluded from between the friction surfaces of the clutch plates when they are brought together to effect clutch engagement and this is the time when the greatest frictional heat is generated and the cooling effect of the oil is most needed. Another disadvantage of such clutches is that quick and complete release of the clutch is often hindered by the presence of the oil between and about the clutch plates because the oil tends to cause the plates to adhere to each other or to produce a cohesive effect generally referred to as "oil drag" in connection with the operation of clutches.

Efforts to ameliorate either of the above conditions tends to accent the other because any increase in the amount of cooling oil in the vicinity of the clutch plates contributes to the undesirable oil drag while reduction of oil reduces the facility for cooling.

It is, therefore, an object of the present invention to provide a clutch of the wet plate type in which an abundance of cooling oil is directed to the clutch plates at all times and particularly when they are in clutching engagement and to provide a clutch with means for insuring immediate disengagement of the plates when pressure is released notwithstanding the presence of oil. Further and more specific objects and advantages and the manner in which these objects are accomplished will appear in the following specification wherein reference is made to the accompanying drawings.

In the drawings:

Fig. 3 is a section through a single clutch plate illustrating a modified form of the invention, and Fig. 4 is an elevation of a single clutch plate illustrating the arrangement thereon of mechanisms like that illustrated in Fig. 3 and showing the arrangement of oil passages on the friction face thereof.

Figure 1:
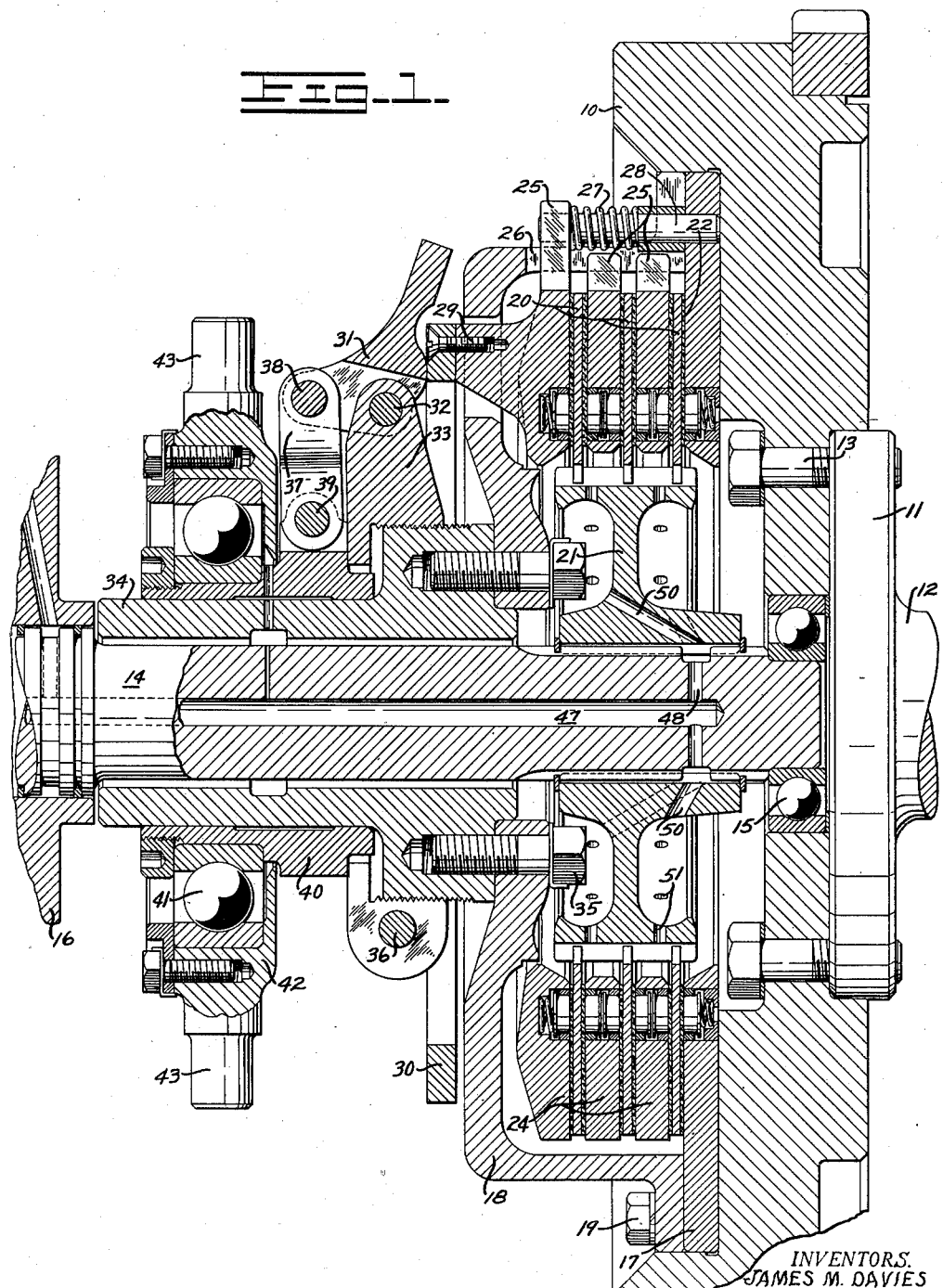
Fig. 1 is a vertical sectional view of a clutch embodying the present invention.

The general arrangement of a clutch embodying the present invention is illustrated in Fig. 1 of the drawings, the clutch being illustrated in its association with an internal combustion engine or the like. In Fig. 1, the fly wheel of an engine is shown at 10 as secured to a flange 11 on an engine crankshaft 12 by cap screws shown at 13. The driven shaft to which power is imparted through the clutch is illustrated at 14 as having one end supported in a pilot bearing 15 in the flywheel and also as being supported by suitable bearings, not shown, which may be disposed in a transmission case or the like, a portion of which is illustrated at 16. The flywheel 10 carries a housing for the clutch plates comprising a plate 17 and a cover 18 both secured to the flywheel by cap screws, one of which is illustrated at 19. Disposed within this housing are a plurality of clutch plates 20 which are splined to a gear like member 21. The member 21 is in turn splined to the driven shaft 14. The opposite faces of the plates 21 are preferably covered with frictional surfacing material of conventional composition as illustrated at 22. Because of their splined connection with the gear 21, which connection is made by gear like spline teeth shown at 23 in Fig. 4 formed on each of the clutch plates 20, they are free to slide or float in a direction longitudinally of the shaft 14 but are fixed against rotation independently of the shaft.

Interposed between the clutch plates 20 are clutch pressure plates 24 also free to move longitudinally with relation to the shaft 14 but keyed against rotation relative to the flywheel by peripherally projecting lugs 25 extending into slots 26 in the periphery of the housing cover 18. The outermost of the clutch pressure plates 24 has its lugs 25 extended radially outwardly beyond the cover 18 for engagement by expansible springs 27 supported by pins 28. The function of the springs 27 is to urge the clutch pressure plates 24, or at least the outermost of said plates, in a direction to relieve the pressure between the plates 20 and pressure plates 24.

In order to cause engagement of the clutch by forcing the pressure plates inwardly and causing them to frictionally engage and drive the clutch plates 20, the outermost of the plates 24 carries lugs 29 which project through openings in the cover 18 and carry a ring 30 against which a plurality of pivoted cam levers 31 may act. The levers 31 are pivotally connected by pins 32 to an adjustable collar 33. This collar is threaded onto a hub like member 34 secured to the cover 18 as by cap screws 35 and may be adjusted in its position on the said collar by means of its threaded connection therewith. A clamping screw 36 shown in section in Fig. 1 extends through a split portion of the collar for securing it in its position of adjustment. Links 37 are connected with the cam levers 31 as by pivot pins 38 and are also pivotally connected as at 39 with a sliding collar 40 which embraces the hub like member 34. A clutch throwout bearing 41 of conventional construction and arrangement is supported by sliding collar 40 and carries a yoke 42 shown as having projecting pins 43 engageable by an actuating lever or the like for imparting sliding movement to the collar 40 and thus swinging the cam levers 31 about their pivotal support for effecting engagement or release of the clutch as desired.

Ordinarily, a clutch of the wet plate type is bathed in oil and the oil may be supplied by any suitable form of pump which withdraws it from the bottom of the housing in which the clutch is contained and directs it toward the clutch plates for the purpose of absorbing the heat of the friction which is generated in the plates, particularly when the clutch is thrown toward its engaged position. The greatest part of this heat is generated as the plates come into frictional contact and at this time their contact excludes the oil and prevents it from performing its cooling function at the time when it is most needed. In the present construction, the friction surfaces of the clutch plates 20 are grooved to permit oil to circulate over them even when they are in contact with the clutch pressure plates 24. For example, as illustrated in Fig. 4, the composition 22 of the friction surface of the plate is shown as having a helical or spirally arranged groove 45 commencing at its inner edge and progressing outwardly throughout the entire width of its face. Radially disposed grooves 46 are also provided to accommodate the free flow of oil. Thus, even when the clutch plates are in close contact, oil may be circulated between them and in close proximity to their contacting surfaces. The grooves 45 and 46 may, if desired, be disposed in the faces of the pressure plates 24 instead of in the friction surfaces of clutch plates 20. To insure distribution of oil through the grooves 45 and 46, oil picked up from the bottom of the casing by a conventional pump, not shown, is directed under pressure through a bore 47 in the driven shaft 14. Radial bores 48 communicate with the bore 47 and direct the oil outwardly toward the gear 21, the hub of which is provided with passages 50 for admitting the oil to both sides of the central web like portion of the gear. The flange of the gear which supports its teeth is curved or dished to form annular receptacles for the accumulation of the oil which is directed radially outwardly of the gear by centrifugal action as it rotates. The flange is also perforated as indicated at 51 so that the oil carried by it will be directed radially outwardly toward the inner edges of the clutch plates 20 and clutch pressure plates 24. The innermost edges of the clutch pressure plates are preferably beveled as indicated at 55 in Fig. 2 to assist in directing the oil toward the grooves 45 and 46 formed in the friction surfaces of the clutch plates. Thus, even while the clutch is in engagement with all of the plates 20 and 24 pressed into close contact with each other, an abundant supply of oil is forcibly circulated in close proximity to the frictional surfaces where the greatest heat is generated during the operation of the clutch and cooling of the surfaces takes place even while the clutch is in its engaged position.

Figure 2:
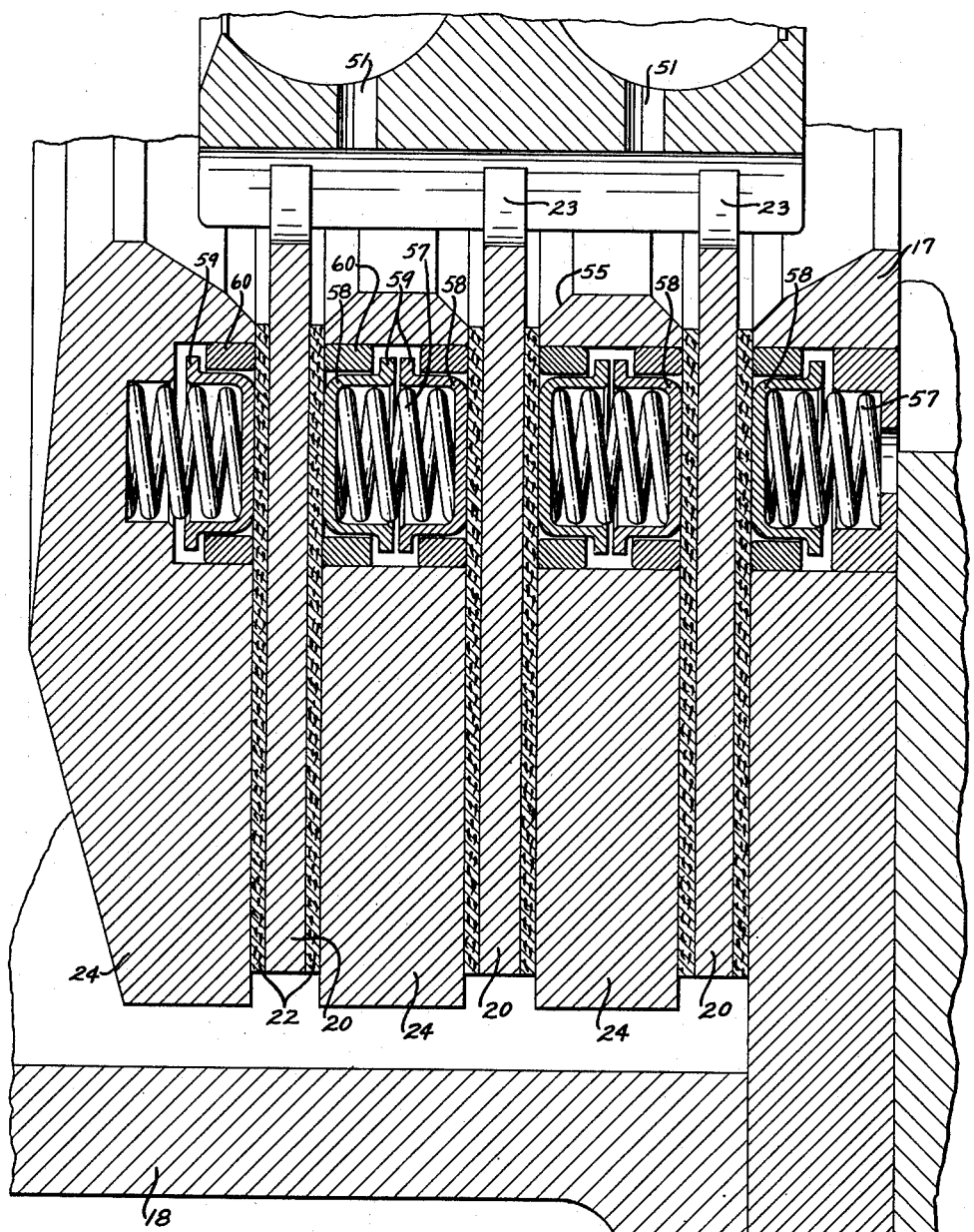
Fig. 2 is an enlarged fragmentary sectional view of a portion of the clutch shown in Fig. 1.

As the presence of oil in the vicinity of the clutch plates causes an oil drag or inhibits separation of the plates even when the clutch engaging pressure is released, the present invention includes means for effecting instant separation of all the plates upon release of the pressure. Such plate separating means are best shown in Fig. 2 wherein each of the clutch pressure plates 24 and the housing plate 17 are shown as having apertures for the reception of springs 57. The ends of the springs 57 engage cups 58 which are urged outwardly and toward engagement with the friction surfaces of the clutch plates 20 by the springs. The cups 58 have flanged edges 59 engageable with rings 60 pressed into the apertures containing the springs for limiting their outward movement. When the clutch is in its engaged position as illustrated in Figs. 1 and 2, the springs 57 are compressed and the cups have no effect. However, when the clutch engaging pressure is released and the pressure plates and clutch plates are free to separate, the action of the springs 57 forces all of the cups outwardly and, by bearing against the adjacent clutch plates, they cause immediate separation of all the plates and overcome any tendency of the plates to adhere due to the presence of oil.

A modified form of the invention is shown in Figs. 3 and 4 wherein the clutch plate separating means is disposed in the clutch plate 20 rather than in the clutch pressure plates as illustrated in Fig. 2. In this modification, a cup like member 62 is provided instead of the cups 58 of Fig. 2, and expansible springs 63 are interposed between this member and the plate itself. A retaining member 64 secured to the clutch plate as by rivets 65 limits the outward movement of the member 62 which may be moved inwardly upon engagement of the clutch by compression of the spring 63. This form of clutch plate releasing means is particularly adaptable to clutches of the single plate type and a plurality of such means may be arranged at intervals throughout the surface of the clutch plate as shown in Fig. 4 where they are illustrated as disposed alternately on opposite sides of the plates.

We claim:

1. In a plate type clutch including a set of driving plates and a set of alternately arranged plates adapted to be driven thereby, one of said sets of plates having recesses formed therein, resilient means contained in said recesses in a position to bear against plates of the other set to facilitate separation of the plates.

2. In a plate type clutch including a set of driving plates and a set of alternately arranged plates adapted to be driven thereby, one of said sets of plates having recesses formed therein, pairs of cup shaped members contained in said recesses, spring interposed between said pairs of cup shaped members to urge them apart and into contact with plates of the other set to facilitate separation of the plates.

JAMES M. DAVIES.
KARL J. MOGK.
RUSSELL C. WILLIAMS.

REFERENCES CITED

The following references are of record in the file of this patent:

UNITED STATES PATENTS

| Number | Name | Date |
|---|---|---|
| 1,527,197 | Klocke | Feb. 24, 1925 |
| 1,622,261 | Payne | Mar. 22, 1927 |
| 1,928,301 | Pierson | Sept. 26, 1933 |
| 1,958,894 | Knape | May 15, 1934 |
| 2,180,086 | Kraft | Nov. 14, 1939 |
| 2,199,801 | Kattwinkel | May 7, 1940 |
| 2,204,499 | Kattwinkel | June 11, 1940 |
| 2,217,357 | Coe | Oct. 8, 1940 |
| 2,241,242 | Friedman | May 6, 1941 |
| 2,380,680 | Thompson | July 31, 1945 |

FOREIGN PATENTS

| Number | Country | Date |
|---|---|---|
| 547,240 | Great Britain | Aug. 19, 1942 |